United States Patent Office 3,737,422
Patented June 5, 1973

3,737,422
L-HISTIDYL-L-PROLINE AMIDE
George Rogelio Flouret, Waukegan, Ill., assignor to Abbott Laboratories, North Chicago, Ill.
No Drawing. Filed Feb. 4, 1970, Ser. No. 8,700
Int. Cl. C07c *103/52;* C07g *7/00*
U.S. Cl. 260—112.5                                  1 Claim

ABSTRACT OF THE DISCLOSURE

A new synthetic route for preparing pyroglutamyl-histidylproline amide in two steps leads to an excellent yield of a highly potent product. The new method uses free histidylproline amide TRH as the starting material and an active ester of pyroglutamic acid as the co-reactant.

DETAILED DESCRIPTION OF THE INVENTION

In recent publications, theories were advanced that the structure of thyrotropin releasing factor or hormone (hereinafter simply referred to as TRH) corresponds to that of pyroglutamylhistidylproline amide. TRH is an extremely valuable drug and laboratory tool, particularly useful in the analysis of pituitary gland functions.

TRH can be prepared synthetically, using the tripeptide glutamylhistidylproline as starting material. This method is obviously expensive because the starting material requires a large number of steps for its preparation. Natural TRH may also be isolated from natural sources but this method is also uneconomical because the yield from 165,000 porcine hypothalami amounts to about 4.4 mg. This clearly demonstrates the necessity for a practical synthetic route. Also, the purity of the product extracted from natural sources is too questionable to be of use as a drug for thyroid disorders.

Synthetic methods starting with the individual amino acids have also been tried but leave much to be desired; for instance, the methods suggested to date require many steps to protect certain groups within the molecules that take part in the reaction. After each reaction step, the protective groups must be removed in a separate procedure. Thus, a classic method of building up the desired tripeptide would involve the use of 2–3 "protection" steps on amino acid starting materials, two essential reaction steps, and 2–3 steps to remove the protective groups, with purification steps necessary for each intermediate. These purifications are particularly cumbersome and, in a practical synthetic route, should be reduced to the minimum in number and should be such that they can be carried out easily and with useful quantities of material.

It is therefore an object of the present invention to provide a practical synthetic method for the production of TRH; it is a particular object of this invention to provide a new starting material for the synthesis of histidyl-proline amide; it is a further object of this invention to provide a synthetic method for the production of TRH from histidylproline amide which can be accomplished in a simple step requiring no protective group on either reactant.

These and other objects are accomplished by providing a method for the preparation of pyroglutamylhistidyl-proline amide comprising coupling the dipeptide histidyl-proline amide with an active ester of pyroglutamic acid in the presence of an inert, polar solvent. The above dipeptide amide can easily be prepared by coupling t-butyloxycarbonylhistidine with proline amide hydrochloride (Chambers et al., J.A.C.S. 77, 1522 of 1955) in the presence of triethylamine with dicyclohexylcarbodiimide as the coupling reagent, followed by removing the protective group from the resulting t-butyloxycarbonylhis-tidylproline amide with hydrochloride acid in an ether solvent to histidylprolineamide hydrochloride. The intermediate t-butyloxycarbonylhistidylproline amide can easily be purified by simple and standard chromatographic techniques, using a column of silica gel with methanol-chloroform as the eluent; the purification of the intermediate is sufficient to produce the dipeptide of acceptable quality for the synthesis of TRH. As the solvent for the cleavage of t-butyloxycarbonyl group, ethyl ether, tetrahydrofurane, ethyl acetate dioxane or similar ethers may be used; useful acids for this step are hydrobromic acid, trifluoroacetic acid, formic acid, etc.

Although useful in the synthesis of other peptide chains, the new compound of the present invention is particularly suited to prepare TRH. In a simple condensation reaction, the new histidylproline amide is coupled with an active ester of pyroglutamic acid, such as trichlorophenyl pyroglutamate directly to produce the desired tripeptide.

In order to show the new procedure in detail, reference is made to the following examples which, however, are not to be construed as limiting the invention in any respect.

EXAMPLE 1

A solution of 1.275 g. of t-butyloxycarbonylhistidine and 0.831 g. of prolineamide hydrochloride in 20 ml. of dimethylformamide was treated with 0.7 ml. of triethylamine. To the cold solution (0° C.) was added 1.032 g. of dicyclohexyldicarbodiimide. After 16 hours, the formed dicyclohexylurea was filtered off and the filtrate was evaporated in vacuo at 40° C. The residual oil was taken up in a small volume of 5% methanol in chloroform and passed through a 20 x 2.5 cm. column packed with 20 g. of silica gel (70–325 mesh; activity 2–3) in chloroform. The column was eluted with methanol/chloroform (1:19, later 3:17 by volume) collecting separate 5 ml. fractions of the eluate. The 5% methanol fractions were saved for later evaluation; the 15%! fractions were analyzed by thin-layer chromatography and selected fractions were pooled and evaporated to yield 1.047 g. (58%) of a foamy solid which could not be crystallized from an organic solvent. It was identified as t-butyloxycarbonyl-histidylprolineamide; $[\alpha]_D^{25}$ —46° (concentration: 1% in water).

EXAMPLE 2

A solution of 0.477 g. of the product of Example 1 in 4 ml. of dioxane was treated with 12 ml. of 4-molar hydrochloric acid in dioxane at room temperature. A white solid separated immediately. After 30 minutes, 100 ml. of ethyl ether was added, the supernatant decanted, and the solid material washed by decantation with four additional 150 ml. portions of ether. The solid residue was dried in vacuo over phosphorous pentoxide and potassium hydroxide, subsequently dissolved in methanol and the solution was treated with a basic ion exchange resin in the hydroxy form. The solvent was removed under reduced pressure and the residue was dried in a desiccator over phosphorous pentoxide. Thin-layer chromatography showed this residue to be a single compound and elemental analysis showed the compound to be the desired histidylproline amide. The two amino acid components were found to be present in a 1:1 molar ratio. However, attempts to crystallize this material was unsuccessful.

EXAMPLE 3

A solution of 1.291 g. of pyroglutamic acid and 2.633 g. of pentachlorophenol in 20 ml. of dimethylformamide was treated at 0° C. with 2.063 g. of dicyclohexylcarbodiimide. After stirring 16 hours, the suspension was filtered to remove the formed dicyclohexylurea and the filtrate was evaporated in vacuo at 40° C. The solid residue was treated with cold ethyl acetate and filtered to yield 2.2 g. of a white solid melting at 180–4° C. Recrystallization from ethyl acetate produced 2.0 g. (54%) of the pure pentachlorophenyl pyroglutamate melting at 196–9° C. $[\alpha]_D^{26}$ +21° (concentration: 2% in dimethylformamide).

The free dipeptide obtained from Example 2 was dissolved in 2 ml. of dimethylformamide and 0.481 g. of pentachlorophenyl pyroglutamate was added. The resulting solution was allowed to stand for 16 hours. The disappearance of the free dipeptide was verified by thin-layer chromatography. The solution was concentrated to an oil which was purified by column chromatography on a 20 x 2.5 cm. column packed with 20 g. of silica gel. The sample was applied as a solution in methanol/chloroform 1:2 (by volume) and eluted with this solvent system in a 2:1 (by volume) ratio with 5 ml. fractions being collected separately and checked by thin-layer chromatography.

The suitable fractions (established by thin-layer chromatography) were pooled and evaporated to dryness. After drying in vacuo over phosphorous pentoxide, the solid white residue weighed 358 mg. (78%). This material was homogeneous as shown by paper chromatography, thin-layer chromatography and electrophoresis. Mass spectrometry of a sample dissolved in methanol at 70 ev. would not reveal a molecular ion; however, at 50 ev., a molecular ion was detected with m/e 363. The nuclear magnetic resonance spectrum shows the expected pattern for pyroglutamylhistidylproline amide.

The above synthetic route for the preparation of pyroglutamylhistidylproline amide can be carried out by using the L- or D-forms of any one of the components. In the preferred embodiment, the L-forms are used since they lead to the active TRH material. For this reason, the preferred material of the present invention is the L-histidyl-L-proline amide.

This new material can easily be synthesized by the above procedure and is an extremely valuable intermediate in the preparation of TRH. Its value is of particular consequence because it can be used directly, i.e., without protective groups, for the preparation of TRH. The synthesis of TRH from the new peptide only requires a single coupling reaction with an active ester of pyroglutamic acid and no protective groups need to be removed from the reaction product.

An additional benefit from the present invention is the fact that the new intermediate, histidylproline amide, can easily be purified by chromatographic methods using simple, readily available resins and simple solvent systems. This is of particular interest since previous methods leading to TRH employ intermediates requiring thin-layer or paper chromatography for purification.

The new method for making TRH is carried out by using an active ester of pyroglutamic acid. The term "active ester" is used to refer to those esters which carry a radical that easily cleaves during the required coupling reaction. Useful esters are those formed with nitrophenol, dinitrophenols, polychlorophenols, o-resorcinol and similar phenols, as described by Schroder and Lubke, in "The Peptides," volume 1, page 97 (1965). An unusually valuable ester therefore is the pentachlorophenyl pyroglutamate; it produces excellent yields of TRH material of high activity.

The reactants for the coupling of the dipeptide to TRH are preferably used in a molar ratio of 1:1; however, a 100% excess of either reactant is of no detrimental effect. The reaction is carried out in an inert, polar solvent such as dimethylformamide, dimethylacetamide, dioxane, tetrahydrofurane, pyridine and the like. The reaction can be performed at a temperature of 15–40° C. and proceeds satisfactorily at room temperature where it is completed within several hours of standing. Slightly elevated temperatures for instance 35° C., may be used to accelerate the reaction, or stirring may be employed for the same purpose.

I claim:
1. L-histidyl-L-proline amide.

References Cited
UNITED STATES PATENTS 3,247,178　4/1966　Schwyzer et al. ____ 260—112.5

OTHER REFERENCES

Burgus et al.: C. R. Acad. Sci. Paris, 269 D, 1870–1873 (1969).

Guttmann: Helv. Chim. Acta., 44, 734 (1961).

Burgus et al.: C. R. Acad. Sci. Paris, Ser. D 269, 226–228 (1969).

Anderson et al.: Acta. Chim. Acad. Sci. Hung., 44, 187–195 (1965).

Morley: Peptides 1968, Bricas, ed., North Holland Publishing Co., Amsterdam (1968), pp. 251–5.

Kovacs et al.: J. Am. Chem. Soc. 87, 118–119 (1965).

Fujino et al.: Chem. Pharm. Bull. 16, 929–932 (1968).

Schmeck: New York Times, vol. CXIX, No. 40, 895, Jan. 11, 1970. Sec. 1, pages 1 and 40.

LEWIS GOTTS, Primary Examiner

R. J. SUYAT, Assistant Examiner